Patented Nov. 17, 1936

2,061,008

UNITED STATES PATENT OFFICE 2,061,008

COMPOSITIONS OF MATTER AND PETROLEUM PRODUCTS AND METHOD OF MAKING SAME

Orland M. Reiff, Woodbury, N. J., assignor to Socony-Vacuum Oil Company, Incorporated, New York, N. Y., a corporation of New York No Drawing. Application October 26, 1935, Serial No. 46,892

10 Claims. (Cl. 87—9)

This invention relates to improved pour point depressants or substances capable of lowering the temperature at which a hydrocarbon oil comprising a substantially homogeneous mixture of liquid oils and waxy solids undergoes loss of fluidity. The invention also contemplates the provision of novel compositions of matter.

Among the principal objects of the present invention is the provision of improved pour point depressants and improved products comprising petroleum oils in combination therewith. Other objects and advantages will appear from the more detailed description of my invention as set forth herein.

In my copending application, Serial No. 18,341, I have disclosed the preparation of pour point depressants obtained by condensing together certain oxyaromatic hydrocarbons and certain chlorinated heavy alkyl hydrocarbons, as described therein. In my copending application, Serial No. 18,390, I have disclosed other pour point depressants which are made by condensing or resinifying the products of said copending application, Serial No. 18,341, with a resinifying agent, as for instance with hexamethylenetetramine, butyraldehyde, or glycerol.

I have now discovered that effective pour point depressants can be prepared by resinifying oxyaromatic hydrocarbons and then condensing resinous materials thus obtained with chlorinated aliphatic hydrocarbons of relatively high molecular weight. This invention is in a sense related to the inventions disclosed in the above-mentioned copending applications.

The oxyaromatic hydrocarbons suitable for the uses of this invention are as follows: Compounds of the general formula

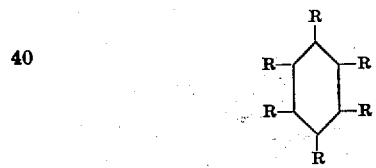

where at least one R represents an hydroxy or alkoxy radical and where one or more of the R's is a replaceable hydrogen or radical (which can be replaced in the above-mentioned condensation by one or more alkyl radicals corresponding to aliphatic hydrocarbons of relatively high molecular weight), and the remaining R's are radicals selected from the group of radicals which consists of hydrogen, halogen, alkyl, aryl (such as phenyl naphthyl), and aralkyl (such as benzyl). Similarly, condensed ring compounds of the general formula

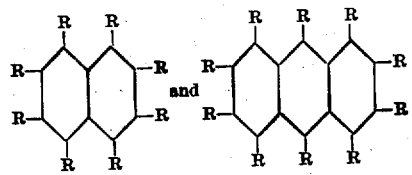

where the R's consist of radicals as defined above, are suitable for making the compounds of this invention. Examples of specific materials suitable for the uses of this invention, which come within the above-defined classes of oxyaromatic hydrocarbons, are phenol, cresol, anisole, p-hydroxydiphenyl, beta-naphthol, resorcinol, hydroquinone, pyrogallol, chlorphenol, benzylphenol, and beta naphthyl methyl ether. Of the above-named materials, phenol and anisole are at present preferred, and the above-defined classes to which these particular compounds belong are the present preferred classes. The least preferred classes are those defined above, in which the remaining R's are hydroxy or alkyl groups (such as $CH_3$), particularly as the number of such groups is increased.

Various resinifying reagents can be used. By way of example, the following are given: Those that eliminate halogen hydrides in reaction with the above-defined classes of oxyaromatic hydrocarbons, for example halogenated organic compounds such as halogenated aralkyl or aryl hydrocarbons, for example, benzyl chloride, chlornaphthalene and chloranthracene; those that eliminate water, such as the aldehydes, particularly the aliphatic aldehydes, ketones, alcohols and polyalcohols, for example formaldehyde, acetaldehyde, butyraldehyde, acetone, butyl alcohol, ethylene glycol and glycerol; sulfur reagents, for example, elementary sulfur and sulfur chlorides, such as sulfur monochloride, which form oxyaromatic hydrocarbon resins with fixation of sulfur and elimination of hydrogen sulfide; oxidizing agents which eliminate nuclear hydrogen, for example, oxygen, potassium permanganate, chlorine and ferric chloride. Of the above-named resinifying agents, formaldehyde, butyraldehyde and sulfur monochloride are at present preferred. Any oxyaromatic hydrocarbon resin as defined herein, formed by condensation reactions, with the elimination of water, halogen hydrides, hydrogen sulfide, nuclear hydrogen, etc., may be used in the preparation of the pour point depressants of this invention, it being, however, an important condition that the resulting resin have sufficient solubility for reaction with the chlorinated aliphatic hydrocarbons. Specific examples are given herein of oxyaromatic hydrocarbon-aldehyde resins, phenol-aryl and aralkyl chloride resins, and a phenol-sulfur resin, these being examples of condensation reactions wherein elimination of water, halogen hydride and hydrogen sulfide, respectively, takes place.

Resinified products thus obtained are condensed, preferably after purification, with chlorinated aliphatic hydrocarbons of relatively high molecular weight, this latter condensation being carried out in accordance with the principle of the Friedel-Crafts' reaction. The chlorinated aliphatic hydrocarbons of relatively high molecular weight which are suitable for the uses of this invention comprise the chlorinated petroleum naphthas, kerosenes, heavy oils such as gas oils and lubricants, petrolatum, and crystalline waxes, and/or similar hydrocarbons derived from other sources, but more especially the chlorinated paraffin waxes, referred to herein as chlorwax.

Preparation of aldehyde resins from aromatic hydroxyl compounds

Aromatic hydroxyl compounds react readily with aldehydes in acid or basic medium. For example, in the reaction of butyraldehyde with aromatic hydroxyl compounds such as phenol or beta-naphthol, the reaction may be carried out suitably at a temperature of 212° F. in the presence of 1% of hydrochloric acid as catalyst.

Representative reaction mixture—

Aromatic hydroxyl compound____ 1 mol.
Butyraldehyde _____ ½ mol.
Hydrochloric acid (sp. gr. 1.18)___ 1% by weight Upon completion of the resinification, the product may be heated in vacuum to remove unreacted products, thereby giving the finished resin.

Preparation of aldehyde resins from aromatic ether compounds

Aromatic ethers, such as phenyl methyl ether (anisole) and beta-naphthyl methyl ether, react less readily with aldehydic resinifying agents than the aromatic hydroxyl compounds. The resinification process may be carried out readily, however, by use of a higher concentration of acid catalyst, concentrated sulfuric acid being preferred. A solvent such as a glacial acetic acid is also desirable.

Representative reaction mixture—

Anisole_____grams__ 100
Trioxymethylene _____do____ 10
Sulfuric acid_____cc__ 40
Glacial acetic acid_____grams__ 100

The anisole, acetic acid and trioxymethylene (as a source of formaldehyde) are mixed together, thereafter adding sulfuric acid slowly with cooling, to keep the reaction temperature below 50° C. The resinification is carried to completion by stirring the reaction mixture at 50° C., for a period of about 2 hours. The resin is purified by treating with water, dissolving in benzol and then washing with alkali, to completely neutralize the acids. The solvent is then distilled, and the product is heated in vacuum to remove any unreacted anisole, thereby obtaining a pale colored resin.

Preparation of sulfur resins from oxyaromatic hydrocarbons

Oxyaromatic hydrocarbon-sulfur resins are prepared by condensing the oxyaromatic hydrocarbon with elementary sulfur or a sulfur compound, such as sulfur chloride, for instance. Sulfur monochloride reacts with phenol for instance, without use of catalyst, to give a pale, viscous or hard resinous product, the degree of hardness increasing with increase in sulfur content. Oxyaromatic hydrocarbon-sulfur resins of low sulfur content are more soluble in oils and solvents in general than resins of higher sulfur content. Phenol-sulfur resins containing one atomic weight or less of sulfur per mol. of phenol, represented by the resin, give the most suitable sulfur resins for the production of pour point depressants by reaction of the resin with chlorwax.

Preparation of oxyaromatic hydrocarbon resins by reaction of oxyaromatic hydrocarbons with halogenated organic compounds Oxyaromatic hydrocarbons may be condensed with halogenated organic compounds with the elimination of halogen hydride to produce oily or resinous products. The chloraryls and chlorarakyls can be used, for example benzyl chloride or chlornaphthalene. Benzyl chloride can be reacted with oxyaromatic hydrocarbons, in the presence or absence of catalysts, to give products of oily or resinous composition. Catalysts are required for the condensation of chloraryls, such as chlornaphthalene, with oxyaromatic hydrocarbons. The products obtained are resinous mixtures, comprising oxyaromatic hydrocarbon resins admixed with aromatic hydrocarbon resins, the latter being formed by the condensation of chlornaphthalene molecules, with the elimination of hydrogen chloride. The following reaction mixtures give suitable products for the preparation of pour point depressants by reaction of the condensation products with chlorwax.

(a)
| | Grams |
|---|---|
| Phenol | 94 |
| Benzyl chloride | 126.5 |
| Aluminum chloride | 4 |

Upon addition of the catalyst to the solution of phenol and benzyl chloride, the reaction is violent at 100° F., with evolution of heat. The reaction is completed by heating the mixture, with stirring, to 200° F. The product may be purified by washing with water to remove the aluminum chloride, using benzol as diluent. Upon distillation of the benzol, a yellowish, oily to resinous product is obtained. The above phenol-benzyl chloride condensation product may be treated directly with chlorwax to produce pour point depressants, without the preliminary procedure of purifying the resinous product.

(b)
| | Grams |
|---|---|
| Phenol | 94 |
| Chlornapthalene (28% chlorine) | 63 |
| Aluminum chloride | 11 |

The reaction mixture is heated to 300° F. during a one-half hour period to complete the evolution of hydrogen chloride. The product may be purified by running it into a benzol-water mixture and water washing to remove the aluminum chloride. Unreacted material may be removed by vacuum distillation, heating to 200° C. at 5 m. m. pressure, to give a brown, hard, brittle resin. The phenol-chlornaphthalene condensation product may be treated directly with chlorwax to produce pour point depressants, without the preliminary procedure of purifying the resin.

Condensation of oxyaromatic hydrocarbon resins with chlorwax

In preparing the chlorwax, I prefer to employ as a starting material paraffinic petroleum wax having an A. S. T. M. melting point of about 130° F. This wax may be chlorinated by melting the wax, holding it at a temperature of approximately 180° to 200° F., and bubbling chlorine gas through it until it has absorbed or combined with about 12% of its weight of chlorine, giving a product of composition approximating that of a monochlorparaffin, hereinafter referred to as monochlorwax.

In the condensation of chlorwax with oxyaromatic hydrocarbon resins, a solvent such as ethylene dichloride may be effectively employed to aid the mixing of the resin with chlorwax. The chlorwax, resin and ethylene dichloride are mixed together, using an amount of solvent to effect good solution of the resin in admixture with chlorwax at room temperature. It is desirable to add the aluminum chloride, in the form of a slurry in ethylene dichloride, to the reaction mixture at a temperature near the boiling point of the solvent (180° F.), to insure better solution of the aluminum chloride complex. After addition of the aluminum chloride catalyst is complete, the reaction temperature may be raised to complete the reaction, allowing the ethylene dichloride to distill. The condensation of chlorwax with aromatic hydroxyl resins may be suitably carried out by use of 6% aluminum chloride in respect to chlorwax, at a maximum reaction temperature of 350° F. Resins prepared from aromatic ether compounds are somewhat more reactive with chlorwax, requiring about 4% aluminum chloride catalyst at a maximum reaction temperature of 350° F. The reaction of chlorwax with oxyaromatic resins is generally carried to completion in about one hour. The reaction product may be separated from the aluminum chloride at the end of the reaction by washing with water or strong alkali (10% sodium hydroxide solution), using a light petroleum distillate as solvent to aid the washing of the product. The solvent is then distilled and the product separated from unreacted wax, if desired, by heating in vacuum at 5 m. m. to 350° C. The pour point depressants prepared from oxyaromatic hydrocarbon resins are quite resinous. Because of the higher concentration of aluminum chloride catalyst and/or temperature required to carry out the reaction, the products are generally darker in color than products prepared from the non-resinified oxyaromatic hydrocarbons.

Representative reaction mixtures for the preparation of wax-substituted oxyaromatic resins in accordance with this invention, along with the effectiveness of the products as pour point depressants, are given as follows:

1. Preparation of wax-substituted phenol-butyraldehyde resin

|  | Grams |
|---|---|
| (a) Chlorwax | 100 |
| Phenol-butyraldehyde resin | 20 |
| Aluminum chloride | 8 |
| (b) Chlorwax | 100 |
| Phenol-butyraldehyde resin | 10 |
| Aluminum chloride | 8 |

Action as pour point depressants

| Used in oil of Saybolt visc. of 249 sec. at 130° F. | A. S. T. M. pour test |
|---|---|
| Without depressant | +20° F. |
| With ½% depressant (a) | −10° F. |
| With 1% depressant (b) | 0° F. |

2. Preparation of wax-substituted anisole-formaldehyde resin

|  | Grams |
|---|---|
| (a) Chlorwax | 100 |
| Anisole-formaldehyde resin | 9½ |
| Aluminum chloride | 4 |
| (b) Chlorwax | 100 |
| Anisole-formaldehyde resin | 12.7 |
| Aluminum chloride | 4 |

Action as pour point depressants

| Used in oil of Saybolt visc. of 249 sec. at 130° F. | A. S. T. M. pour test |
|---|---|
| Without depressant | +20° F. |
| With ½% depressant (a) | −5° F. |
| With ¼% depressant (b) | −10° F. |
| With ¼% depressant (b) | +10° F. |

3. Preparation of wax-substituted cresol-butyraldehyde resin

| (a) Chlorwax | grams | 100 |
|---|---|---|
| Cresol-butyraldehyde resin | do | 15 |
| Ethylene dichloride | cc | 100 |
| Aluminum chloride | grams | 8 |

Action as pour point depressants

| Used in oil of Saybolt visc. of 249 sec. at 130° F. | A. S. T. M. pour test |
|---|---|
| Without depressant | +20° F. |
| With ½% depressant | +20° F. |
| With 1% depressant | +15° F. |
| With 2% depressant | +15° F. |

4. Preparation of wax-substituted beta-naphthol-butyraldehyde resin

| (a) Chlorwax | grams | 100 |
|---|---|---|
| Beta-naphthol-butyraldehyde resin | grams | 14.25 |
| Ethylene dichloride | cc | 100 |
| Aluminum chloride | grams | 6 |

Action as pour point depressants

| Used in oil of Saybolt visc. of 249 sec. at 130° F. | A. S. T. M. pour test |
|---|---|
| Without depressant | −20° F. |
| With ½% depressant (a) | 0° F. |

5. Preparation of wax-substituted phenol-benzyl chloride condensation product

|  | Grams |
|---|---|
| (a) Chlorwax | 100 |
| Resin | 7.85 |
| Aluminum chloride | 3 |
| (b) Chlorwax | 100 |
| Resin | 10.44 |
| Aluminum chloride | 3 |

6. Preparation of wax-substituted phenol-chlornaphthalene resin

| | |
|---|---|
| Chlorwax grams | 100 |
| Resin do | 10 |
| Ethylene chloride cc | 100 |
| Aluminum chloride grams | 3 |

Action as pour point depressants

| Used in oil of Saybolt visc. of 249 sec. at 130° F. | A. S. T. M. pour test |
|---|---|
| Without depressant | +20° F. |
| With ½% depressant | −25° F. |

7. Preparation of wax-substituted phenol-sulfur resin

| | Grams |
|---|---|
| Chlorwax | 100 |
| Resin (30% sulfur content) | 15 |
| Aluminum chloride | 3 |

Action as pour point depressants

| Used in oil of Saybolt visc. of 249 sec. at 130° F. | A. S. T. M. pour test |
|---|---|
| Without depressant | +20° F. |
| With ½% depressant | −25° F. |
| With ¼% depressant | −10° F. |

The foregoing examples show that the degree of pour point depression is dependent upon the proportion of reactants used in preparation of the wax-substituted oxyaromatic resin. In this characteristic they are similar to pour point depressants prepared by the reaction of chlorwax with the non-resinified oxyaromatic hydrocarbons. Chlorwax-oxyaromatic resin mixtures containing as little as one atomic weight of chlorin per mol. of the oxyaromatic compound represented by the resin, will give effective pour point depressants. Further, reaction mixtures containing sufficient chlorwax to saturate the oxyaromatic hydrocarbon resin, may be used in the preparation of pour point depressants. The preferred reaction mixtures are those containing sufficient chlorwax to saturate the oxyaromatic resin, giving thereby the most heat-stable products for use as pour point depressants in wax-containing motor lubricating oils.

Also I may employ other chlorwaxes or other chlorinated aliphatic hydrocarbons in place of the monochlorwax specified in the examples of my invention given above. Thus, while I prefer, in the practice of my invention, to employ a chlorwax, or other chlorinated aliphatic hydrocarbon as defined above, containing about 12% chlorine, and corresponding approximately to monochlorwax as specified in the above discussion, I may employ other chlorwax containing other proportions of chlorine to the wax, or other aliphatic hydrocarbons, without departing from my invention. Thus I may employ with good results, a chlorinated wax or other chlorinated aliphatic hydrocarbon containing as little as say 9% and as much as about 18% of chlorine to the wax or other aliphatic hydrocarbon. If excessively large proportions of chlorine are employed, there is a tendency to reduce the amount of desired aliphatic substituents of relatively high molecular weight and to produce undesirable side reactions.

Also the Friedel-Crafts' reaction may be carried out without the use of the ethylene dichloride as specified in the above example, or other similar solvent, in which case the aluminum chloride catalyst is added to the mixture of reactants at a temperature of 150° F., thereafter raising the reaction temperature to complete the reaction. Although the reactants may not form a homogeneous solution at 150° F., solution will be gradually effected as the temperature is raised. However, it will be understood that I prefer to use ethylene dichloride or other similar solvent to aid the mixing of the resin and chlorwax in starting the condensation reaction. Also the amount of ethylene dichloride or other suitable solvent may be varied, but it is desirable to use an amount sufficient to effect complete solution of the resin and the chlorwax or other chlorinated aliphatic hydrocarbon, at room temperature.

The alkyl-substituted resinified oxyaromatic hydrocarbons referred to above may be prepared from mixtures of resinified oxyaromatic hydrocarbons and chlorinated aliphatic hydrocarbons containing as little as say 35 grams, or slightly more, of chlorine per gram molecular weight of unresinified oxyaromatic compound, represented by the resin, corresponding approximately to a mono-substituted oxyaromatic hydrocarbon. Also, they may be prepared from mixtures containing a greater proportion of chlorine, up to a proportion sufficient to saturate the oxyaromatic compound. Mixtures throughout the range just stated result in pour point depressants, made in accordance with this invention, which possess good properties of solubility in petroleum lubricating oils and stability for use in automobile engines.

I claim:

1. As a new composition of matter a hydrocarbon oil composition of low pour point comprising a hydrocarbon oil of normally higher pour point, and in combination therewith a small proportion, sufficient to substantially reduce the pour point, of a resinous condensation product comprising the reaction product of oxyaromatic hydrocarbon material selected from the group consisting of hydroxyaromatic compounds and aromatic ethers, condensed with a resinifying agent capable of resinifying the oxyaromatic hydrocarbon material, and subsequently condensed with halogenated aliphatic hydrocarbon material of relatively high molecular weight in the presence of a catalyst.

2. As a new composition of matter a hydrocarbon oil composition of low pour point comprising a hydrocarbon oil of normally high pour point, and in combination therewith a small proportion, sufficient to substantially reduce the pour point but not in excess of 1%, of a resinous condensation product comprising the reaction product of oxyaromatic hydrocarbon material of the group consisting of hydroxyaromatic compounds and aromatic ethers, condensed with a resinifying agent capable of resinifying the oxyaromatic hydrocarbon material, and subsequently condensed with chlorinated paraffin wax in the presence of a catalyst.

3. As a new composition of matter, a lubricant oil composition of low pour point comprising a hydrocarbon oil of normally high pour point and in combination therewith a small amount, sufficient to depress the pour point, of an oil-miscible, synthetic resinous material produced by first condensing a substance selected from the class which consists of oxyaromatic hydrocarbons of the general formula

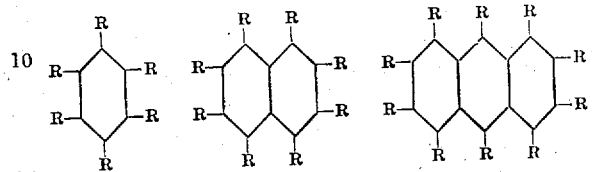

in which at least one of the R's represents an hydroxy or alkoxy radical, one or more of the R's is a radical that can be replaced in the final condensation and the remaining R's are hydrogen, with a resinifying agent capable of resinifying said substance, and subsequently condensing the resinous product with chlorinated aliphatic hydrocarbons of high molecular weight in the presence of a catalyst of the nature of aluminium chloride.

4. As a new composition of matter a lubricant oil composition of low pour point comprising a hydrocarbon oil of normally high pour point, and in combination therewith a small proportion, sufficient to substantially reduce the pour point, of a resinous condensation product comprising the reaction product of an oxyaromatic hydrocarbon of the group consisting of hydroxyaromatic compounds and aromatic ethers, condensed with a resinifying agent capable of resinifying the oxyaromatic hydrocarbon material, and subsequently condensed with a chlorinated aliphatic hydrocarbon of relative high molecular weight in the presence of a catalyst, the proportion of the chlorinated aliphatic hydrocarbon being not substantially less than that corresponding to the mono-substituted oxyaromatic compound and not substantially greater than that corresponding to complete saturation of the oxyaromatic compound.

5. As a new composition of matter, a lubricant oil composition of low pour point comprising a hydrocarbon oil of normally high pour point and in combination therewith a small amount, sufficient to depress the pour point, of an oil-miscible, synthetic resinous material produced by first condensing a substance selected from the class which consists of oxyaromatic hydrocarbons of the general formula

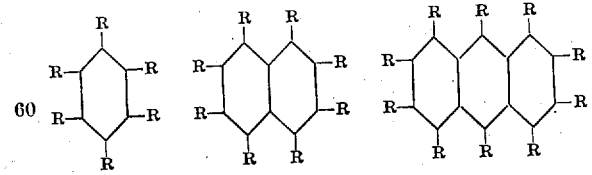

in which at least one of the R's represents an hydroxy or alkoxy radical, one or more of the R's is a radical that can be replaced in the final condensation and the remaining R's are radicals selected from the group which consists of hydrogen, halogen, alkyl, aryl and aralkyl, with a resinifying reagent of the class consisting of halogenated organic compounds, aldehydes, ketones, alcohols, sulfur, sulfur chlorides, oxygen, chlorine, ferric chloride and other oxidizing agents, and subsequently condensing the resinous product with chlorinated aliphatic hydrocarbon material of relative high molecular weight in the presence of a catalyst of the nature of aluminium chloride.

6. As a new composition of matter, a lubricant oil composition of low pour point comprising a hydrocarbon oil of normally high pour point and in combination therewith a small amount, sufficient to depress the pour point but not in excess of 1%, of an oil-miscible, synthetic resinous material produced by first condensing a substance selected from the class which consists of oxyaromatic hydrocarbons of the general formula

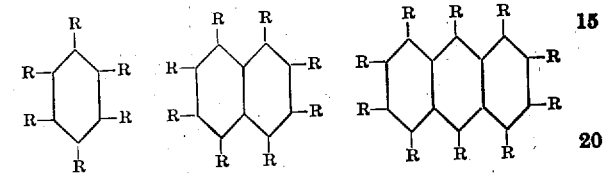

in which at least one of the R's represents an hydroxy or alkoxy radical, one or more of the R's is a radical that can be replaced in the final condensation and the remaining R's are radicals selected from the group which consists of hydrogen, halogen, alkyl, aryl and aralkyl, with a resinifying reagent selected from the group consisting of aldehydes, sulfur and sulfur chlorides and subsequently condensing the resinous product with chlorinated aliphatic hydrocarbon material of relative high molecular weight in the presence of a catalyst of the nature of aluminium chloride.

7. As a new composition of matter a lubricant oil composition of low pour point comprising a hydrocarbon oil of normally high pour point and in combination therewith a small amount, sufficient to depress the pour point, of an oil-miscible, synthetic resinous material produced by first condensing a substance selected from the class which consists of oxyaromatic hydrocarbons of the general formula

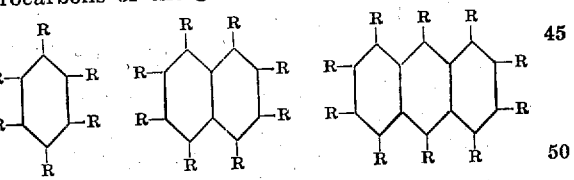

in which at least one of the R's represents a hydroxy or alkoxy radical, one or more of the R's is a radical that can be replaced in the final condensation and the remaining R's are radicals selected from the group which consists of hydrogen, halogen, alkyl, aryl and aralkyl, with a resinifying reagent selected from the group consisting of the aliphatic aldehydes and the sulfur chlorides and subsequently condensing the resinous product with chlorwax in the presence of a catalyst of the nature of aluminium chloride.

8. As a new composition of matter, a lubricant oil composition of low pour point comprising a lubricant oil of normally high pour point, and in combination therewith a small proportion, sufficient to substantially reduce the pour point thereof, of a phenol-aldehyde resin condensed with chlorwax in the presence of a catalyst.

9. As a new composition of matter, a lubricant oil composition of low pour point comprising a lubricant oil of normally high pour point, and in combination therewith a small proportion, sufficient to substantially reduce the pour point thereof, of naphthol-aldehyde resin condensed with chlorwax in the presence of a catalyst.

10. As a new composition of matter, a lubricant oil composition of low pour point comprising a lubricant oil of normally high pour point, and in combination therewith a small proportion, sufficient to substantially reduce the pour point thereof, of phenol-sulfur resin condensed with chlorwax in the presence of a catalyst.

ORLAND M. REIFF.

CERTIFICATE OF CORRECTION.

Patent No. 2,061,008.  November 17, 1936.

ORLAND M. REIFF.

It is hereby certified that error appears in the printed specification of the above numbered patent requiring correction as follows: Page 2, first column, line 61 should read Glacial acetic acid _____do_____100 instead of "Glacial acetic acid_____grams_____100"; and that the said Letters Patent should be read with this correction therein that the same may conform to the record of the case in the Patent Office.

Signed and sealed this 23rd day of February, A. D. 1937.

(Seal)

Henry Van Arsdale
Acting Commissioner of Patents.

point, and in combination therewith a small proportion, sufficient to substantially reduce the pour point thereof, of naphthol-aldehyde resin condensed with chlorwax in the presence of a catalyst.

10. As a new composition of matter, a lubricant oil composition of low pour point comprising a lubricant oil of normally high pour point, and in combination therewith a small proportion, sufficient to substantially reduce the pour point thereof, of phenol-sulfur resin condensed with chlorwax in the presence of a catalyst.

ORLAND M. REIFF.

CERTIFICATE OF CORRECTION.

Patent No. 2,061,008.

November 17, 1936.

ORLAND M. REIFF.

It is hereby certified that error appears in the printed specification of the above numbered patent requiring correction as follows: Page 2, first column, line 61 should read Glacial acetic acid _____do\_\_\_\_\_100 instead of "Glacial acetic acid\_\_\_\_\_grams\_\_\_\_\_100"; and that the said Letters Patent should be read with this correction therein that the same may conform to the record of the case in the Patent Office.

Signed and sealed this 23rd day of February, A. D. 1937.

(Seal)

Henry Van Arsdale
Acting Commissioner of Patents.

CERTIFICATE OF CORRECTION.

Patent No. 2,061,008.                                       November 17,

ORLAND M. REIFF.

It is hereby certified that error appears in the printed specification the above numbered patent requiring correction as follows: Page 2, first column, line 61 should read Glacial acetic acid _____do_____100 instead of "Glacial acetic acid_____grams_____100"; and that the said Letters Patent should be read with this correction therein that the same may conform to the record of the case in the Patent Office.

Signed and sealed this 23rd day of February, A. D. 1937.

(Seal)

Henry Van Arsdale
Acting Commissioner of Patents.